United States Patent
Xie et al.

(10) Patent No.: US 12,182,256 B1
(45) Date of Patent: Dec. 31, 2024

(54) PROVENANCE GRAPH-ORIENTED HOST INTRUSION DETECTION METHOD AND SYSTEM, AND STORAGE MEDIUM

(71) Applicant: HUAZHONG UNIVERSITY OF SCIENCE AND TECHNOLOGY, Hubei (CN)

(72) Inventors: Yulai Xie, Hubei (CN); Shuangbiao Dai, Hubei (CN); Dan Feng, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/695,628

(22) PCT Filed: Aug. 9, 2023

(86) PCT No.: PCT/CN2023/111942
§ 371 (c)(1),
(2) Date: Mar. 26, 2024

(30) Foreign Application Priority Data

Jul. 4, 2023  (CN) .......................... 202310816190.3

(51) Int. Cl.
*G06F 21/55* (2013.01)
(52) U.S. Cl.
CPC ................................... *G06F 21/55* (2013.01)
(58) Field of Classification Search
CPC .............................................. G06F 21/55–566
See application file for complete search history.

(56) References Cited

U.S. PATENT DOCUMENTS 11,423,146 B2 * 8/2022 Li ....................... G06F 18/2413
2022/0050895 A1 * 2/2022 Yu ........................... G06F 21/55

FOREIGN PATENT DOCUMENTS

CN    113612749 A  * 11/2021
CN    115118451 A    9/2022
(Continued)

OTHER PUBLICATIONS

Bilot T, El Madhoun N, Al Agha K, Zouaoui A. Graph neural networks for intrusion detection: A survey. IEEE Access. May 12, 2023. (Year: 2023).*

(Continued)

*Primary Examiner* — Madhuri R Herzog
(74) *Attorney, Agent, or Firm* — HSML P.C.

(57) ABSTRACT

The present invention discloses a provenance graph-oriented host intrusion detection method and system, and a storage medium, which relates to the field of cyber security. The method includes: S1, acquiring provenance data of a host to be tested, to construct a provenance graph representing user behaviors; S2, mapping nodes in the provenance graph to roles, constructing a node feature matrix composed of feature vectors which can be used to represent attribute features, structural features, and inter-node interactive relationship of the nodes in the provenance graph, and mapping nodes having similar feature vectors to the same role; S3, performing an attention-guided attribute temporal random walk by comprehensively considering attributes of the nodes in the provenance graph, the temporal relationship between edges, and an attention parameter between different roles; and S4, converting the acquired attribute temporal random walk sequence into an embedding vector to extract a feature of the provenance graph, and performing intrusion anomaly detection. The present invention can perform deep representation learning on provenance data, reduce the workload of training a detection model, and improve the accuracy and efficiency of intrusion detection.

9 Claims, 1 Drawing Sheet

---

S1, Acquire provenance data of a host to be tested, to construct a provenance graph representing user behaviors;

↓

S2, Map nodes in the provenance graph to roles, construct a node feature matrix a feature vector of which is used to represent an attribute feature, a structural feature, and an inter-node interactive relationship of the nodes in the provenance graph, and map nodes having similar feature vectors to the same role;

↓

S3, Perform an attention-involving attribute timing random walk by comprehensively considering attributes of the nodes in the provenance graph, the timing relationship between edges, and an attention parameter between different roles;

↓

S4, Convert an acquired attribute timing random walk sequence into an embedding vector to extract a feature of the provenance graph, and perform intrusion anomaly detection.

(56) References Cited

FOREIGN PATENT DOCUMENTS

| | | |
|---|---|---|
| WO | 2021077642 A1 | 4/2021 |
| WO | 2021179838 A1 | 9/2021 |

OTHER PUBLICATIONS

Milajerdi, Sadegh M., et al. "Holmes: real-time apt detection through correlation of suspicious information flows." 2019 IEEE Symposium on Security and Privacy (SP). IEEE, 2019. (Year: 2019).*

International Search Report and Written Opinion issued in PCT/CN2023/111942, dated Nov. 24, 2023, 11 pages provided, with English translation.

* cited by examiner

S1, Acquire provenance data of a host to be tested, to construct a provenance graph representing user behaviors;

S2, Map nodes in the provenance graph to roles, construct a node feature matrix a feature vector of which is used to represent an attribute feature, a structural feature, and an inter-node interactive relationship of the nodes in the provenance graph, and map nodes having similar feature vectors to the same role;

S3, Perform an attention-involving attribute timing random walk by comprehensively considering attributes of the nodes in the provenance graph, the timing relationship between edges, and an attention parameter between different roles;

S4, Convert an acquired attribute timing random walk sequence into an embedding vector to extract a feature of the provenance graph, and perform intrusion anomaly detection.

FIG. 1

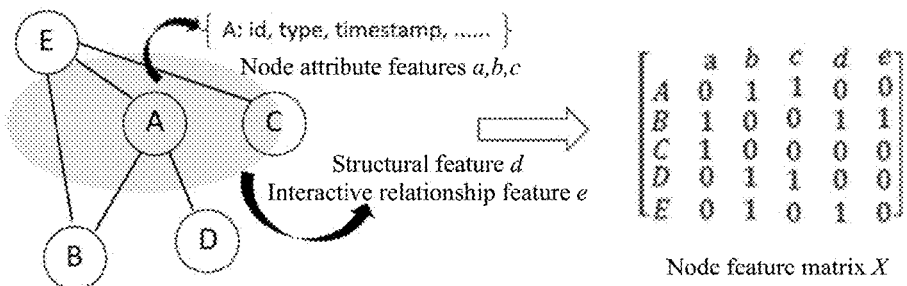

FIG. 2

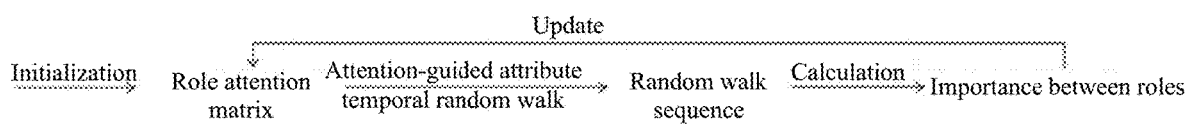

FIG. 3

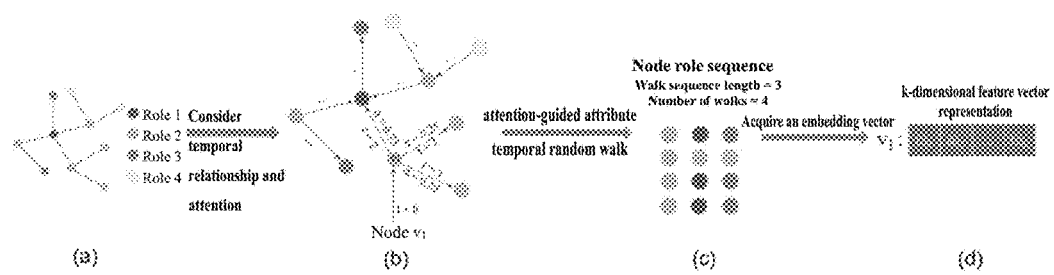

FIG. 4

PROVENANCE GRAPH-ORIENTED HOST INTRUSION DETECTION METHOD AND SYSTEM, AND STORAGE MEDIUM

TECHNICAL FIELD

The present invention belongs to the technical field of cyber security, and more specifically, relates to a provenance graph-oriented host intrusion detection method and system, and a storage medium.

BACKGROUND ART

Intrusion detection technology is one of the core technologies in the field of cyber security. In said technology, it is determined, by means of analysis and by using information (e.g., network traffic, host logs, etc.) acquired from a computer system and a computer network, whether abnormal behavior violating security policy is present in the system or network or whether the system or network has been attacked. As an active protection technology, intrusion detection is of great significance to the security protection of networks and systems.

Conventional host intrusion detection methods typically use system calls or logs as data sources to analyze and identify intrusions to hosts. However, these methods are easily bypassed by attackers due to defects in the data sources (system calls/logs) thereof, resulting in low detection precision. Provenance-based host intrusion detection uses provenance data as a data source. The provenance data provides a complete structured view of events occurring on a system or network by describing system data objects (a process, file, socket, and pipeline) and the complex dependencies between the data objects, and the complete structured view is presented as a directed acyclic graph (a provenance graph), thereby fundamentally enhancing the accuracy and robustness of detection.

A conventional provenance-based host intrusion detection method uses a general graph embedding model (e.g., Deep-Walk, Node2Vec, or GraphSAGE) or a graph kernel algorithm (e.g., Weisfeiler-Lehma) to perform representation learning on provenance graph data to acquire embedding vectors, and performs intrusion detection on the basis of data features represented by the embedding vectors. Such a method can perform only shallow representation learning on the provenance graph data, and the acquired data features are limited. As user behaviors gradually become diversified and attack methods used by attackers become complex, such an embedding vector acquired on the basis of a general model or algorithm represents a provenance data feature that is relatively homogeneous, and such shallow representation learning does not consider specific application scenarios of intrusion detection and required data features, resulting in a poor representation learning effect, and when the same is applied to intrusion detection, detection efficiency is low. In addition, a lot of manpower and time are required to adjust and train a detection model.

SUMMARY OF THE INVENTION

In view of the defects and improvement requirements of the prior art, the present invention provides a provenance graph-oriented host intrusion detection method and system, and a storage medium, the objective of which is to improve the accuracy and efficiency of intrusion detection based on provenance graph data.

In order to achieve the above objective, according to a first aspect of the present invention, provided is a provenance graph-oriented host intrusion detection method, comprising:

S1, acquiring provenance data of a host to be tested, to construct a provenance graph representing user behaviors;

S2, mapping nodes in the provenance graph to roles, constructing a node feature matrix composed of feature vectors which can be used to represent attribute features, structural features, and inter-node interactive relationship of the nodes in the provenance graph, and mapping nodes in the node feature matrix having similar feature vectors to the same role;

S3, performing an attention-guided attribute temporal random walk, and generating an attribute temporal random walk sequence the starting point of which is a current node $v_i$ and the length of which is L: $\phi(x_{i_1})$, $\phi(x_{i_2}), \ldots, (\phi(x_{i_L}))$, where $x_i$ is the feature vector of the node $v_i$; $\phi(x)$ represents a function for mapping a node to a role, where $(v_{i_t}, v_{i_{t+1}}) \in E_T$, $1 \ll t \ll L$ and $T(v_{i_t}, v_{i_{t+1}}) \ll T(v_{i_{t+1}}, v_{i_{t+2}})$, and $(v_{i_t}, v_{i_{t+1}})$ is an edge connected between a node $v_{i_t}$ and the next node $v_{i_{t+1}}$; $E_T$ is a set composed of all edges in the provenance graph; t is a sequence number in the walk sequence; and $T(v_{i_t}, v_{i_{t+1}}) \ll T(v_{i_{t+1}}, v_{i_{t+2}})$ indicates that the creation time of the edge between the nodes $v_{i_t}$, $v_{i_{t+1}}$ is earlier than the creation time of the edge between the nodes $v_{i_{t+1}}$, $v_{i_{t+2}}$; and the current node walks to neighbor nodes corresponding to different roles at different probabilities, the probabilities being an attention parameter between the roles, and being used to reflect the importance between the roles; and S4, converting the attribute temporal random walk sequence into an embedding vector to extract a feature of the provenance graph, and performing intrusion anomaly detection.

Further, in S3, the attention parameter between the roles is represented by means of a role attention matrix M, and an acquisition method of the role attention matrix M comprises:

S301, setting equal transition probabilities as the current role attention matrix M;

S302, using the current role attention matrix M to perform the attention-guided attribute temporal random walk to acquire an embedding vector $e_i$ of the current node $v_i$ and embedding vectors $e_N$ corresponding to all neighbor nodes of the current node;

S303, using the embedding vectors $e_i$ and $e_N$ to update the current role attention matrix M:

$$M_{ij} = \text{softmax}(\delta(w_j, w_i)) = \frac{\exp(\delta(w_j, w_i))}{\sum_{w_r \in R_i} \exp(\delta(w_r, w_i))}$$

$$\delta(w_j, w_i) = \text{mean}(\{e_j, e_j \in e_N \text{ and } v_j \in N_{w_j}\}) \cdot e_i$$

where softmax represents a normalization operator, $w_i$ represents the role corresponding to the current node $v_i$, $w_j$ represents an element in a role set corresponding to all the neighbor nodes' roles of the current node $v_i$, $\delta(w_j, w_i)$ represents the importance of the role $w_j$ to the role $w_i$, $e_i$ is the embedding vector corresponding to the current node $v_i$, $N_{w_j}$ represents a set of nodes in the neighbor nodes which belongs to the role $w_j$, and the mean function is used to aggregate embedding vectors corresponding to the same type of role in the sequence; and S304, repeating S302 and S303, until the role attention matrix M becomes stable, thereby acquiring the needed role attention matrix M.

Further, in S304, the number of roles the transition probability change of which exceeds a predefined first threshold is acquired by calculating the distance between two role attention matrices acquired by two consecutive iterations, and if the number is less than a predefined second threshold, the role attention matrix M becomes stable.

Further, in S4, the attribute temporal random walk sequence is inputted to a SkipGram model to calculate an embedding vector of each node.

Further, in S4, the embedding vector is inputted to a pretrained intrusion detection model to perform intrusion anomaly detection.

Further, the function $\phi(x)$ for mapping nodes to roles is a binary operator or a k-means clustering function.

Further, after the provenance data of the host to be tested is acquired, S1 further comprises: filtering out provenance data unrelated to intrusion behavior, and removing nodes having the same attribute feature.

Further, the nodes in the provenance graph are used to represent data objects of the host to be tested, and the data objects comprise a progress, file, socket, and pipeline.

According to another aspect of the present invention, provided is a provenance graph-oriented host intrusion detection system, configured to perform the method according to any item of the first aspect, the system comprising:

a provenance graph construction module, configured to acquire provenance data of a host to be tested, to construct a provenance graph representing user behaviors;

a role mapping module, configured to map nodes in the provenance graph to roles, construct a node feature matrix composed of feature vectors which can be used to represent attribute features, structural features, and inter-node interactive relationship of the nodes in the provenance graph, and map nodes in the node feature matrix having similar feature vectors to the same role;

a random walk module, configured to perform an attention-guided attribute temporal random walk, and generate an attribute temporal random walk sequence the starting point of which is a current node $v_i$ and the length of which is L: $\phi(x_{i_1})$, $\phi(x_{i_2})$, ..., $(x_{i_L})$, where $x_i$ is the feature vector of the node $v_i$; and $\phi(x)$ represents a function for mapping a node to a role, where $(v_{i_t}, v_{i_{t+1}}) \in E_T$, $1 \ll t \ll L$ and $T(v_{i_t}, v_{i_{t+1}}) \ll T(v_{i_{t+1}}, v_{i_{t+2}})$, and $(v_{i_t}, v_{i_{t+1}})$ is an edge connected between a node $v_{i_t}$ and the next node $v_{i_{t+1}}$, and $E_T$ is a set composed of all edges in the provenance graph; t is a sequence number in the walk sequence, $T(v_{i_t}, v_{i_{t+1}}) \ll T(v_{i_{t+1}}, v_{i_{t+2}})$ indicates that the creation time of the edge between the nodes $v_{i_t}, v_{i_{t+1}}$ is earlier than the creation time of the edge between the nodes $v_{i_{t+1}}, v_{i_{t+2}}$; and the current node walks to neighbor nodes corresponding to different roles at different probabilities, the probabilities being an attention parameter between the roles, and being used to reflect the importance between the roles; and an anomaly detection module, configured to convert the attribute temporal random walk sequence into an embedding vector to extract a feature of the provenance graph, and perform intrusion anomaly detection.

According to another aspect of the present invention, provided is a computer-readable storage medium, comprising a stored computer program; when executed by a processor, the computer program controls a device in which the computer-readable storage medium is located to perform the provenance graph-oriented host intrusion detection method according to any item of the first aspect.

In general, the above technical solutions proposed in the present invention can achieve the following beneficial effects:

(1) In the provenance graph-oriented host intrusion detection method of the present invention, during an attention-guided attribute temporal random walk, considering that data in a provenance-based intrusion detection scenario is sequential, that is, inter-node relationships and behavior occur according to a temporal order, a constructed walk policy considers temporal feature of an edge of a provenance graph, so that a temporal evolution relationship between nodes can be captured, and therefore an acquired embedding vector can represent a dynamic feature of intrusion behavior. In addition, nodes of different roles have different behavior and features in the provenance graph. During a random walk, considering the effect of neighbor nodes of different roles on embedding, inter-node interaction patterns and information transmission can be better captured, and the capability of sensing and understanding the behavioral features of different roles can be improved, thereby more accurately distinguishing between normal behavior and potential intrusion behavior, enabling a finally acquired embedding vector to provide a more precise feature for tasks such as node classification, node clustering, node similarity calculation, etc., achieving deep representation of provenance data, and thus improving the accuracy of intrusion detection.

In the method of the present invention, nodes in the node feature matrix having similar attribute features, structural features, and inter-node interactive relationships are mapped to the same role. By means of role mapping, a large number of nodes can be classified into a group of roles having similar features and behavioral patterns, thereby reducing the complexity of information, thus simplifying an intrusion detection procedure, reducing the number of nodes that need to be analyzed, and improving the efficiency of intrusion detection.

(2) In the method of the present invention, the provenance data having undergone the role mapping can enable the inter-node behavioral pattern to be better identified, and allows abnormal behavior and abnormal interaction pattern to be easily found. The behavioral feature and interaction means of the role are used, so that nodes having similar features and behavioral patterns have similar embedding vectors even if the nodes are far from each other in the provenance graph. During intrusion detection, the association between node features can be fully explored, thereby effectively extracting the features of nodes in the intrusion behavior-oriented provenance graph, facilitating the provision of more precise features for subsequent tasks such as node classification, node clustering, node similarity calculation, etc., and thus further improving the accuracy and efficiency of intrusion detection.

(3) Preferably, valid provenance information is extracted by means of preprocessing such as filtering, compression, etc., thereby further improving the efficiency of intrusion detection.

In summary, the present invention can effectively solve the problem in which it is difficult for existing provenance-based intrusion detection technology to perform deep representation learning on ever-growing and increasingly complex provenance data, as well as reduce the workload of training a detection model, and improve the accuracy and efficiency of intrusion detection.

BRIEF DESCRIPTION OF THE DRAWINGS

FIG. 1 is a flowchart of a provenance graph-oriented host intrusion detection method according to the present invention.

FIG. 2 is a schematic diagram of constructing a node feature matrix on the basis of a provenance graph provided in an embodiment of the present invention.

FIG. 3 is a schematic diagram of steps for updating a role attention matrix provided in an embodiment of the present invention.

FIG. 4 is a schematic diagram of a procedure of an embedding vector of a node on the basis of an attention-guided attribute temporal random walk provided in an embodiment of the present invention, wherein (a) to (d) in FIG. 4 each represent different phases of the attention-guided attribute temporal random walk performed on nodes.

DETAILED DESCRIPTION

In order for the purpose, technical solution, and advantages of the present invention to be clearer, the present invention is described in further detail below with reference to the accompanying drawings and embodiments. It should be understood that the specific embodiments described herein are only used to explain the present invention, and not to limit the present invention. In addition, the technical features involved in various embodiments of the present invention described below can be combined with one another as long as they do not constitute a conflict therebetween.

In the present invention, the terms "first," "second," and the like in the present invention and the accompanying drawings are used to distinguish similar objects, but are not necessarily used to describe a specific sequence or order.

As shown in FIG. 1, a provenance graph-oriented host intrusion detection method of the present invention mainly includes:

S1, acquiring provenance data of a host to be tested, and using the provenance data to construct a provenance graph representing user behaviors.

S2, constructing a node feature matrix on the basis of attribute features, structural features, and inter-node interactive relationship of nodes in the provenance graphs, mapping all nodes to roles by using a role mapping function, and mapping nodes in the node feature matrix having similar attribute features, structural features, and inter-node interactive relationships to the same role, the nodes in the provenance graph being used to represent data objects such as a progress, file, socket, pipeline, etc., the structural features of the nodes being used to represent information of the positions of the nodes in the graph, and the inter-node interactive relationship being a behavioral pattern of the nodes, and being used to represent the interactive relationship between a current node and another node.

S3, performing an attention-guided attribute temporal random walk, and generating an attribute temporal random walk sequence the starting point of which is a current node $v_i$ and the length of which is L: $\phi(x_{i_1}), \phi(x_{i_2}), \ldots, \phi(x_{i_L})$, wherein $x_i$ is a k-dimensional feature vector of the node $v_i$, and is used to represent the attribute feature and the structural feature of the node and the interactive relationship between the node and an adjacent node; $\phi(x)$ represents a function for mapping the node of which the feature vector is x to a role; and $\phi: x \rightarrow w$, where x represents the k-dimensional feature vector corresponding to the node, and w represents the role corresponding to the node;

where, $(v_{i_t}, v_{i_{t+1}}) \in E_T$, $1 \ll t \ll L$ and $T(v_{i_t}, v_{i_{t+1}}) \ll T(v_{i_{t+1}}, v_{i_{t+2}})$, $(v_{i_t}, v_{i_{t+1}})$ represents an edge connected between a node $v_{i_t}$, and the next node $v_{i_{t+1}}$ thereof in the provenance graph, $E_T$ represents a set composed of all edges in the provenance graph, t represents a sequence number in the walk sequence, T represents the time when an edge between two nodes is established, $T(v_{i_t}, v_{i_{t+1}}) \ll T(v_{i_{t+1}}, v_{i_{t+2}})$ indicates that the creation time of the edge between the nodes $v_{i_t}, v_{i_{t+1}}$ is earlier than a the creation time of the edge between the nodes $v_{i_{t+1}}, v_{i_{t+2}}$, and during the random walk, the probabilities of the current node walking to neighbor nodes corresponding to different roles is determined by an attention parameter between the roles.

S4, converting the acquired attribute temporal random walk sequence into an embedding vector to extract a feature in the provenance graph, to perform intrusion detection.

Specifically, in S1, a provenance capture system is used to intercept a system call of the host to be tested and generate provenance data that records user behaviors. The provenance data can provide a complete structured view of events that occur on a system by describing system data objects (a process, file, socket, pipeline, etc.) and complex dependencies between the data objects, the complete structured view being presented as a directed acyclic graph (a provenance graph).

In embodiments of the present invention, systems such as SPADE, Camflow, etc., are used to acquire provenance information about a system kernel, a file format, an application, etc., that record user behaviors.

Preferably, S1 further includes: preprocessing the acquired provenance data to filter out provenance information unrelated to intrusion behaviors, removing nodes having completely identical attribute information, and filtering out redundant information unrelated to intrusion detection, such as a temporary file, an environment variable, etc. Valid provenance information is extracted by means of preprocessing such as filtering, compression, etc., so as to improve the efficiency of detection.

Specifically, as shown in FIG. 2, in S2, the attribute features of the nodes include the type of node, the ID, a timestamp, the version of the node, and other attribute features of the node. Each row or column in the node feature matrix represents the k-dimensional feature vectors corresponding to the nodes, including the attribute feature, the structural feature, and the inter-node interactive relationship of the nodes.

In embodiments of the present invention, in an example in which the provenance graph includes five nodes, A, B, C, D, and E, a converted node feature matrix X is as shown in FIG. 2.

In S2, the role mapping function $\phi$ may be acquired by means of learning or manual definition. In embodiments of the present invention, the role mapping function $\phi$ is defined as a binary operator. In other embodiments, the role mapping function $\phi$ may also be defined as a k-means clustering function.

In addition, features and behavioral patterns being the same within a set error range are similar features and behavioral patterns. In embodiments of the present invention, all the nodes in the provenance graph are mapped to n roles.

Specifically, as shown in FIG. 3, in S3, a role attention matrix is used to represent the attention parameter between roles, i.e., the importance between different roles. The role attention matrix is iteratively trained and updated so as to learn the optimal adaptive attention parameter between roles, including:

S301, setting equal transition probabilities as the current role attention matrix M;

S302, using the current role attention matrix M to perform the attention-guided attribute temporal random walk to acquire an attention-guided attribute temporal random walk sequence l the starting point of which is a current node $v_i$ and the length of which is L, and inputting the sequence to a SkipGram model to calculate an embedding vector $e_i$ of the current node $v_i$ and an embedding vector $e_N$ corresponding to all neighbor nodes of the current node, where N represents a set formed by all the neighbor nodes of the node $v_i$; S303, using the embedding vectors $e_i$ and $e_N$ to update the role attention matrix M; and S304, repeating S302 and S303, until the role attention matrix M becomes stable, thereby acquiring the needed role attention matrix M.

Specifically, in S303, the using the embedding vectors $e_i$ and $e_N$ to update the role attention matrix M is:

$$M_{ij} = \text{softmax}(\delta(w_j, w_i)) = \frac{\exp(\delta(w_j, w_i))}{\sum_{w_r \in R_i} \exp(\delta(w_r, w_i))}$$

$$\delta(w_j, w_i) = \text{mean}(\{e_j, e_j \in e_N \text{ and } v_j \in N_{w_j}\}) \cdot e_i$$

where softmax represents a normalization operator, $w_i$ represents the role corresponding to the current node $v_i$, $w_j$ represents an element $w_j$ in a role set $R_i$ corresponding to all the neighbor nodes' roles of the current node $v_i$, $\delta(w_j, w_i)$ represents the importance of the role $w_j$ to the role $w_i$, $e_i$ is the embedding vector corresponding to the current node $v_i$, $e_N$ is the embedding vector corresponding to all the neighbor nodes of the current node, $N_{w_j}$ represents a set of nodes in the neighbor nodes which belongs to the role $w_j$, and the mean aggregator mean function is used to aggregate embedding vectors corresponding to the same type of role in the attention-guided attribute temporal random walk sequence.

The value of $M_{ij}$ falls within [0, 1], and each element therein represents the probability of the current node $v_i$ which belongs to the role $w_i$ walking to the neighbor node belonging to the role $w_j$.

Specifically, in S304, the transition probability change of the nodes is acquired by recording the distance (calculating the difference) between two role attention matrices acquired after two consecutive instances of iterative updating, and the number of nodes the transition probability change of which is greater than a predefined first threshold is recorded. If the number is less than a predefined second threshold, this means that the role attention matrix M has become stable, and the iterative updating stops, thereby acquiring the needed role attention matrix M. In embodiments of the present invention, the first threshold is set to 0.05, and the second threshold is the ratio of changed nodes, the ratio being set to 10%.

Specifically, after the role mapping in S2 and the attention matrix updating step in S3 are completed, an attention-guided attribute temporal random walk is performed on all the nodes to acquire a walk node role sequence, and then a final embedding vector is acquired by means of the Skip-Gram model. In embodiments of the present invention, the node $v_1$ is used as an example to describe a procedure of acquiring an embedding vector of the node $v_1$ on the basis of an attention-guided attribute temporal random walk in the present invention. As shown in (a) in FIG. 4, first, all the nodes in the provenance graph are mapped to four role types (role 1 to role 4) by means of role mapping. Then, the temporal relationship between edges and an attention parameter between different roles are comprehensively considered. As shown in (b) in FIG. 4, t represents the time when the edges are generated, and α represents the attention parameter. Then, a random walk is performed by using the node $v_1$ as a starting point. A role set N corresponding to neighbor nodes of the node $v_1$={role 2, role 1}. The attention parameter between the role 2 to which the node $v_1$ belongs and the role 2 corresponding to the neighbor nodes of the node $v_1$ is 0.25, and the attention parameter between the role 2 to which the node $v_1$ belongs and the role 1 corresponding to the neighbor nodes of the node $v_1$ is 0.75. The length of the random walk is set to 3, and the number of walks is set to 4. Ideally, the number of walks from the node $v_1$ to the neighbor nodes corresponding to the role 1 is three, and the number of walks from the node $v_1$ to the neighbor nodes corresponding to the role 2 is one. The acquired random walk sequence is shown in (c) in FIG. 4. Finally, an embedding vector is acquired by means of the SkipGram model, as shown in (d) in FIG. 4.

Specifically, in S4, the acquired embedding vector is inputted to a pretrained intrusion detection model to perform intrusion anomaly detection.

The embedding vector is used to reflect the similarity between the role corresponding to the current node $v_i$ and the role corresponding to the neighbor node thereof. The higher the similarity, indicating the more important the role to which the neighbor node belongs is to the current node $v_i$.

In the provenance graph-oriented host intrusion detection method of the present invention, during an attention-guided attribute temporal random walk the starting point of which is the current node $v_i$, considering that data in a provenance-based intrusion detection scenario is sequential, that is, inter-node relationships and behavior occur according to a temporal order, a constructed walk policy considers the generation time of the edge of the provenance graph, so that a temporal evolution relationship between nodes can be captured, and therefore an acquired embedding vector can represent a dynamic feature of intrusion behavior.

In addition, the constructed walk policy considers the effect of the role neighbor nodes on the walk from the current node. Nodes of different roles have different behaviors and features in the provenance graph. Considering the effect of neighbor nodes of different roles on embedding, inter-node interaction patterns and information transmission can be better captured, and the capability of sensing and understanding the behavioral features of different roles can be improved, thereby more accurately distinguishing between normal behavior and potential intrusion behavior, so as to improve the efficiency of intrusion detection based on provenance graph data.

That is, the method of the present invention considers the effect of both the generation time of the edges of the provenance graph and the neighbor nodes of different roles on embedding, so that the temporal feature of the intrusion behavior is better captured, thereby improving the capability of sensing the temporal correlation. Modeling is performed for neighbor nodes of different roles, thereby improving the capability of sensing and understanding the behavioral features of different roles. The finally acquired embedding vector can provide a more precise feature for tasks such as node classification, node clustering, node similarity calculation, etc., thereby improving the accuracy of an intrusion detection system.

In the method of the present invention, nodes in the node feature matrix having similar attribute features, structural features, and inter-node interactive relationships are mapped to the same role. By means of role mapping, a large number of nodes can be classified into a group of roles having similar features and behavioral patterns, thereby reducing the complexity of information, thus simplifying an intrusion detection procedure, and reducing the number of nodes that need to be analyzed.

The provenance data having undergone the role mapping enables the inter-node behavioral pattern to be better identified, and allows abnormal behavior and abnormal interaction patterns to be easily found. The behavioral feature and interaction means of the role are used, so that nodes having similar features and behavioral patterns have similar embedding vectors even if the nodes are far from each other in the provenance graph. During intrusion detection, the association between node features can be fully explored, thereby effectively extracting the features of nodes in the intrusion behavior-oriented provenance graph, facilitating the provision of more accurate features for subsequent tasks such as node classification, node clustering, node similarity calculation, etc., and thus further improving the accuracy and efficiency of intrusion detection.

Mapping to the role can provide an understanding of the structural features of the positions of the nodes in the graph, facilitate analysis of how node behavior and interactions are incorporated into the entire graph structure, facilitate detection of an abnormal graph structure and node position, and improve the capability of sensing intrusion behavior.

In addition, role mapping enables an intrusion detection result to be more easily understood and interpreted. Different roles represent different behavior and features, thereby providing a more visual intrusion detection output than node information, facilitating the visualization of the behavior of and relationships between different roles in the provenance graph, and helping analyzers to better understand and evaluate potential intrusion behavior.

In summary, mapping provenance information to a role can reduce complexity, improve pattern identification capability, facilitate context modeling, and enhance interpretability and visualization capabilities. Improvements in these aspects help improve the accuracy, efficiency, and intelligibility of intrusion detection, thereby more efficiently detecting and handling potential intrusion behavior.

According to another aspect of the present invention, provided is a provenance graph-oriented host intrusion detection system, configured to perform the corresponding steps in the provenance graph-oriented host intrusion detection method in the embodiments described above, the system including:
a provenance graph construction module, configured to acquire provenance data of a host to be tested, to construct a provenance graph representing user behaviors;
a role mapping module, configured to map nodes in the provenance graph to roles, construct a node feature matrix composed of feature vectors which can be used to represent attribute features, structural features, and inter-node interactive relationship of the node in the provenance graph, and map nodes in the node feature matrix having similar feature vectors to the same role;
a random walk module, configured to perform an attention-guided attribute temporal random walk, and generate an attribute temporal random walk sequence the starting point of which is a current node $v_i$ and the length of which is L: $\phi(x_{i_1})$, $\phi(x_{i_2})$, ..., $\phi(x_{i_L})$, where $x_i$ is the feature vector of the node $v_i$; and $\phi(x)$ represents a function for mapping a node to a role, where $(v_{i_t}, v_{i_{t+1}}) \in E_T$, $1 \ll t \ll L$ and $T(v_{i_t}, v_{i_{t+1}}) \ll T(v_{i_{t+1}}, v_{i_{t+2}})$, and $(v_{i_t}, v_{i_{t+1}})$ is an edge connected between a node $v_{i_t}$ and the next node $v_{i_{t+1}}$; $E_T$ is a set composed of all edges in the provenance graph; t is a sequence number in the walk sequence; and $T(v_{i_t}, v_{i_{t+1}}) \ll T(v_{i_{t+1}}, v_{i_{t+2}})$ indicates that the creation time of the edge between the nodes $v_{i_t}, v_{i_{t+1}}$ is earlier than the creation time of the edge between the nodes $v_{i_{t+1}}, v_{i_{t+2}}$; the current node walks to neighbor nodes corresponding to different roles at different probabilities, the probabilities being an attention parameter between the roles, and being used to reflect the importance between the roles; and
an anomaly detection module, configured to convert the attribute temporal random walk sequence into an embedding vector to extract a feature of the provenance graph, and perform intrusion anomaly detection.

According to another aspect of the present invention, provided is a computer-readable storage medium, including a stored computer program, wherein when executed by a processor, the computer program controls a device in which the computer-readable storage medium is located to perform the provenance graph-oriented host intrusion detection method in the embodiments described above.

The attention-guided attribute temporal random walk policy of the present invention, is a random walk proposed for provenance-based intrusion detection scenarios, the attributes of the nodes of the provenance graph, the temporal relationship, and the weight of walking from the current node to the role corresponding to the neighbor node thereof are comprehensively explored, and the finally acquired embedding vector can provide a more precise feature for tasks such as node classification, node clustering, node similarity calculation, etc., thereby achieving deep representation of provenance data, and improving the accuracy rate of an intrusion detection system. In addition, the intrusion detection model does not need to be adjusted or trained during intrusion detection.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A provenance graph-oriented host intrusion detection method, the method comprising:
S1, acquiring provenance data of a host to be tested, and constructing a provenance graph representing user behaviors based on the provenance data;
S2, mapping nodes in the provenance graph to roles, constructing a node feature matrix composed of feature vectors used to represent attribute features, structural features, and inter-node interactive relationship of the nodes in the provenance graph, and mapping nodes in the node feature matrix having similar feature vectors to the same role;
S3, performing an attention-guided attribute temporal random walk on the provenance graph, and generating an attribute temporal random walk sequence the starting point of which is a current node $v_i$, and the length of which is L: $\phi(X_{i_1}), \phi(X_{i_2}), \ldots, \phi(X_{i_L})$, where $x_i$ is the feature vector of the node $v_i$; $\Phi(X)$ represents a function for mapping a node to a role, where $(v_{i_t}, v_{i_{t+1}}) \in E_T$, $1 \ll t \ll L$ and $T(v_{i_t}, v_{i_{t+1}}) \ll T(v_{i_{t+1}}, v_{i_{t+2}})$, and $(v_{i_t}, v_{i_{t+1}})$ is an edge connected between a node $v_{i_t}$ and a next node $v_{i_{t+1}}$; $E_T$ is a set composed of all edges in the provenance graph; t is a sequence number in the attribute temporal random walk sequence; and $T(v_{i_t}, v_{i_{t+1}}) \ll T(v_{i_{t+1}}, v_{i_{t+2}})$ indicates that a creation time of the edge between nodes $v_{i_t}$ and $v_{i_{t+1}}$ is earlier than the creation time of the edge between nodes $v_{i_{t+1}}$ and $v_{i_{t+2}}$; and the current node walks to neighbor nodes corresponding to different roles at different probabilities, the probabilities being an attention parameter between the roles, and being used to reflect the importance between the roles; and S4, converting the attribute temporal random walk sequence into an embedding vector to extract a feature of the provenance graph, and performing intrusion anomaly detection by inputting the embedding vector to a pretrained intrusion detection model.

2. The method according to claim 1, wherein in S3, the attention parameter between the roles is represented by means of a role attention matrix M, and an acquisition method of the role attention matrix M comprises:

S301, setting equal transition probabilities of the roles as a current role attention matrix M having element $M_{ij}$, wherein i represents i-th row and j represents j-th column of the current role attention matrix M;

S302, using the current role attention matrix M to perform the attention-guided attribute temporal random walk to acquire an embedding vector $e_i$ of a current node $v_i$ and embedding vectors $e_N$ corresponding to all neighbor nodes of the current node;

S303, using the embedding vectors $e_i$ and $e_N$ to update the current role attention matrix M:

$$M_{ij} = \text{softmax}(\delta(w_j, w_i)) = \frac{\exp(\delta(w_j, w_i))}{\sum_{w_r \in R_i} \exp(\delta(w_r, w_i))}$$

$$\delta(w_j, w_i) = \text{mean}(\{e_j, e_j \in e_N \text{ and } v_j \in N_{w_j}\}) \cdot e_i$$

where softmax represents a normalization operator, $w_i$ represents the role corresponding to the current node $v_i$, $w_j$ represents an element in a role set corresponding to all the neighbor nodes' roles of the current node $v_i$, $\delta(w_j, w_i)$ represents the importance of the role $w_j$ to the role $w_i$, $e_i$ is the embedding vector corresponding to the current node $v_i$, $N_{w_j}$ represents a set of nodes in the neighbor nodes which belongs to the role $w_j$, and the mean function is used to aggregate embedding vectors corresponding to the same type of role in the sequence; and S304, repeating S302 and S303, until the role attention matrix M becomes stable, thereby acquiring the needed role attention matrix M.

3. The method according to claim 2, wherein in S304, the number of roles for which the transition probability change exceeds a predefined first threshold is acquired by calculating the distance between two role attention matrices acquired by two consecutive iterations of executing S302 and S303, and if the number is less than a predefined second threshold, the role attention matrix M becomes stable.

4. The method according to claim 1, wherein in S4, the attribute temporal random walk sequence is inputted to a SkipGram model to calculate an embedding vector of each node.

5. The method according to claim 1, wherein the function $\phi(x)$ for mapping nodes to roles is a binary operator or a k-means clustering function.

6. The method according to claim 1, wherein after the provenance data of the host to be tested is acquired, S1 further comprises: filtering out provenance data unrelated to intrusion behavior, and removing nodes having a same attribute feature.

7. The method according to claim 1, wherein the nodes in the provenance graph are used to represent data objects of the host to be tested, and the data objects comprise a progress, file, socket, and pipeline.

8. A provenance graph-oriented host intrusion detection system being configured to perform the method according to claim 1, the system including a host computer and comprising:

a provenance graph construction module configured to acquire provenance data of the host computer to be tested, and to construct a provenance graph representing user behaviors based on the provenance data;

a role mapping module configured to map nodes in the provenance graph to roles, construct a node feature matrix composed of feature vectors used to represent attribute features, structural features, and inter-node interactive relationship of the nodes in the provenance graph, and map nodes in the node feature matrix having similar feature vectors to the same role;

a random walk module configured to perform an attention-guided attribute temporal random walk on the provenance graph, and generate an attribute temporal random walk sequence the starting point of which is a current node $v_i$ and the length of which is L: $\phi(X_{i_1})$, $\phi(X_{i_2}), \ldots, \phi(X_{i_L})$, where $x_i$ is the feature vector of the node $v_i$; $\Phi(X)$ represents a function for mapping a node to a role, where $(v_{i_t}, v_{i_{t+1}}) \in E_T$, $1 \ll t \ll L$ and $T(v_{i_t}, v_{i_{t+1}}) \ll T(v_{i_{t+1}}, v_{i_{t+2}})$, and $(v_{i_t}, v_{i_{t+1}})$ is an edge connected between a node $v_{i_t}$ and a next node $v_{i_{t+1}}$; $E_T$ is a set composed of all edges in the provenance graph; t is a sequence number in the attribute temporal random walk sequence; and $T(v_{i_t}, v_{i_{t+1}}) \ll T(v_{i_{t+1}}, v_{i_{t+2}})$ indicates that a creation time of the edge between nodes $v_{i_t}$ and $v_{i_{t+1}}$ is earlier than the creation time of the edge between nodes $v_{i_{t+1}}$ and $v_{i_{t+2}}$; and the current node walks to neighbor nodes corresponding to different roles at different probabilities, the probabilities being an attention parameter between the roles, and being used to reflect the importance between the roles; and an anomaly detection module configured to convert the attribute temporal random walk sequence into an embedding vector to extract a feature of the provenance graph, and perform intrusion anomaly detection by inputting the embedding vector to a pretrained intrusion detection model.

9. A non-transitory computer-readable storage medium, comprising a stored computer program; when executed by a processor, the computer program controls a device in which the computer-readable storage medium is located to perform the provenance graph-oriented host intrusion detection method according to claim 1.

* * * * *